United States Patent [19]

Hutt

[11] Patent Number: 5,763,032
[45] Date of Patent: Jun. 9, 1998

[54] HEAT-SHRINKABLE ARTICLE

[75] Inventor: Norman Hutt, Swindon, England

[73] Assignee: Raychem Limited, Swindon, United Kingdom

[21] Appl. No.: 535,219

[22] PCT Filed: May 16, 1994

[86] PCT No.: PCT/GB94/01041

§ 371 Date: Mar. 27, 1996

§ 102(e) Date: Mar. 27, 1996

[87] PCT Pub. No.: WO94/27175

PCT Pub. Date: Nov. 24, 1994

[30] Foreign Application Priority Data

May 18, 1993 [GB] United Kingdom ............... 9310235

[51] Int. Cl.$^6$ ............................................. H01B 7/00
[52] U.S. Cl. ............... 428/36.1; 174/120 R; 174/121 A; 442/60; 442/85
[58] Field of Search ................. 428/36.1; 442/60, 442/85, 209; 174/120 R, 121 A

[56] References Cited

U.S. PATENT DOCUMENTS

| | | | |
|---|---|---|---|
| 4,514,465 | 4/1985 | Schoenberg | 428/339 |
| 4,554,202 | 11/1985 | Kamei et al. | 428/225 |
| 4,590,124 | 5/1986 | Schoenberg | 428/339 |
| 4,617,241 | 10/1986 | Mueller | 428/520 |
| 4,820,557 | 4/1989 | Warren | 428/34.9 |
| 4,923,722 | 5/1990 | Kondo et al. | 428/34.9 |
| 4,981,749 | 1/1991 | Kubo et al. | 428/219 |
| 5,023,143 | 6/1991 | Nelson | 428/516 |
| 5,079,051 | 1/1992 | Garland et al. | 428/34.9 |
| 5,110,686 | 5/1992 | Taka et al. | 428/516 |
| 5,266,392 | 11/1993 | Land et al. | 428/224 |

FOREIGN PATENT DOCUMENTS

| | | |
|---|---|---|
| 0225152 | 6/1987 | European Pat. Off. . |
| 3243102 | 5/1984 | Germany . |
| 4039965 | 6/1992 | Germany . |
| 2019412 | 9/1982 | United Kingdom . |
| 2135240 | 8/1984 | United Kingdom . |
| 2181437 | 4/1987 | United Kingdom . |
| 220667 | 1/1990 | United Kingdom . |
| 2220667 | 1/1990 | United Kingdom . |

*Primary Examiner*—James J. Bell
*Attorney, Agent, or Firm*—Herbert G. Burkard

[57] ABSTRACT

A composite material having heat shrinkable fibers comprising LLDPE, characterized in that the LLDPE has a weight average molecular weight of from 55,000 to 130,000 and a crystallinity less than 60%.

14 Claims, No Drawings

HEAT-SHRINKABLE ARTICLE

The present invention relates to an article having improved heat-shrink characteristics, in particular to one combining improved heat-shrink characteristics and excellent mechanical properties. Heat-shrink articles find particular use in environmental protections of substrates such as cables and pipes, particularly splices in telecommunications cables. For example, a cable splice case is expected to have a life-time comparable to that of the cables it joins, typically 25 years, under unfavourable environmental conditions. Products for use as cable splice cases must pass rigorous temperature and pressure cycling tests if their purchaser is to have confidence that they will perform satisfactorily over these long life times. Designing a splice case is therefore a difficult matter, and careful choice of materials must be made.

Heat-shrinkable materials have been widely used for environmental protection because they can be produced over-sized, easily installed, and then shrunk into tight, sealing engagement with the substrate to be protected. They are frequently internally coated with a heat-activatable adhesive such that the heating required for installation causes both shrinkage of the article and activation of the adhesive. In this way, an excellent environmental seal can be produced.

Recently, heat-shrinkable composite materials have begun to replace monolithic heat-shrinkable sleeves in particular in the telecommunications cable accessories market. Such composite materials have the advantage of superior mechanical properties, in particular split-resistance. They are manufactured by incorporating a heat-shrinkable fabric within a matrix material; shrinkable fibres of the fabric drive shrinkage of the product and provide split-resistance perpendicular to the shrink direction, glass fibres of the fabric provide additional strength, and the matrix material renders the product impervious.

Whilst such composite products are ideal for many applications, there are occasions when the temperature and quantity of heat required for installation are too great. Problems may therefore arise where an open-flame torch, which can supply vast quantities of heat, is considered undesirable, and/or where the cable or other substrate around which the heat shrinkable article is to be shrunk is easily damaged by heat. For example, optical fibre cables are generally rather small and do not carry a large mass of highly heat-conducting copper. They are therefore easily damaged by heat. It is desirable therefore that a technique be found for joining or sealing them that avoids high temperature and prolonged heating.

It is generally recognised that of the few broad types of materials used for the formation of heat-shrinkable articles, LLDPE thin film has advantages where low shrink temperatures are required. Unfortunately, that information is not very helpful since a vast number of materials of widely differing properties are known as LLDPE, and what applies to thin film for temporary packaging cannot be assumed to apply to the generally thick-walled materials required for long-term environmental protection of, for example, outside telecommunications cable plant.

Nonetheless, a brief review of LLDPE may be made. The table below shows just some of the LLDPEs available.

TABLE 1

| Supplier | Trade Name | Grade | Density |
|---|---|---|---|
| DSM | Teamex | Cast Film | 0.902 |
| DSM | Stamylex 08-026F | Cast Film | 0.91 |
| DSM | Stamylex 08-076F | Cast Film | 0.911 |
| DSM | Stamylex 09-046F | Cast Film | 0.915 |
| DSM | Stamylex 09-016F | Blown Film | 0.914 |
| DSM | Stamylex 1016F | Blown Film | 0.919 |
| DSM | Stamylex 1026F | Blown Film | 0.919 |
| DSM | Stamylex 1046F | Cast film | 0.919 |
| DSM | Stamylex 1066F | Cast film | 0.919 |
| DSM | Stamylex 09-258 | Injection | 0.917 |
| DSM | Stamylex 2258 | Injection | 0.927 |
| DSM | Stamylex 3026F | Cast film | 0.932 |
| DSM | Stamylex 4026F | Cast film | 0.936 |
| DSM | Stamylex 4046F | Cast film | 0.935 |
| Quantum | Petrothene GA501 | Film | 0.918 |
| Quantum | Petrothene GA502 | Film | 0.918 |
| Quantum | Petrothene GA601 | Film | 0.918 |
| Quantum | Petrothene GA604 | Cast film | 0.916 |
| Quantum | Petrothene GA605 | Film | 0.926 |
| Quantum | Petrothene GB501 | Film | 0.919 |
| Quantum | Petrothene GB502 | Film | 0.919 |
| Quantum | Petrothene GA564 | Injection | 0.924 |
| Quantum | Petrothene GA574 | Injection | 0.926 |
| Quantum | Petrothene GB564 | Injection | 0.924 |
| Quantum | Petrothene GB574 | Injection | 0.926 |
| Quantum | Petrothene GA584 | Injection | 0.929 |
| Dow | Attane 4011E | Blown film | 0.912 |
| Dow | Attane 4000E | Cast coext | 0.913 |
| Dow | Dowlex 2288E | Cast H. S. | 0.917 |
| Dow | Dowlex 2035E | Cast film | 0.919 |
| Dow | Dowlex 2245E | Blown film | 0.92 |
| Dow | Dowlex 2045E | Blown film | 0.92 |
| Dow | Dowlex 2552E | Injection | 0.92 |
| Dow | Dowlex NG5056E | Blown film | 0.919 |
| Dow | Dowlex NG5055E | Blown film | 0.923 |
| Dow | Dowlex NG5059.01E | Blown film | 0.926 |
| Dow | Dowlex 2059E | Blown lam | 0.926 |
| Dow | Dowlex 2049E | Blown film | 0.926 |
| Dow | Dowlex 2042E | Blown film | 0.93 |
| Dow | Dowlex 2343E | Pipe extr. | 0.937 |
| Dow | Dowlex 2043E | Blown film | 0.937 |
| Dow | Dowlex 2740E | Tapes/fib | 0.94 |
| DuPont | Sclair 11D-1 | Blown film | 0.919 |
| DuPont | Sclair 11F-2 | Blow/coext | 0.919 |
| DuPont | Sclair 11P-1 | Blow/coext | 0.919 |
| DuPont | Sclair 11K-1 | Blow/coext | 0.92 |
| DuPont | Sclair 11U-4 | Blow/coext | 0.922 |
| DuPont | Sclair 11Q-4 | Blow/coext | 0.919 |
| DuPont | Sclair 2107 | Injection | 0.924 |
| DuPont | Sclair 2111 | Injection | 0.924 |
| DuPont | Sclair 2510UV8A | Injection | 0.94 |
| DuPont | Sclair 2114 | Inj. hiflow | 0.924 |
| DuPont | Sclair 2316 | Inj. hiflow | 0.93 |
| DuPont | Sclair 2514 | Inj. hiflow | 0.94 |
| DuPont | Sclair 8107 | Rot. mould | 0.922 |
| Exxon | Escorene 4006 | W & C | |
| Exxon | Escorene 4028 | Injection | |

We have found that the great majority of these LLDPEs does not overcome the problems that we wish to solve, and that the patent literature does not give much guidance.

EP-A-0225152 (Raychem) discloses a heat-shrinkable composite article for environmental protection of telecommunications splice cases. The composite contains a heat-shrinkable fabric, the shrinkable fibres of which may be LLDPE. Unfortunately, no guidance is given concerning the LLDPE and the material is merely mentioned as one grade of polethylene.

U.S. Pat. No. 4,554,202 (Kamei et al) discloses a packing cloth comprising a woven fabric made from a thread obtained by melt extrusion of LLDPE having a density of less than 0.945 g/cm$^2$ and having a branched short chain . This material is stretched at a temperature of less than 120° C. The cloth apparently has an improved tear strength and notch propagation resistance. The LLDPE is said to have a branched short chain having ten or fewer carbon atoms. The material has a melt flow index of from 0.05 to 3 g/10 minutes. The LLDPE maybe extruded through a slit of a dye in the form of a film and, after cooling, stretched at a temperature preferably from 70° to 110° C. at a stretch ratio of between 2 and 9. The resulting fabric may be laminated onto a surface of a plastic film layer having heat shrinkability identical or similar to that of the fabric itself.

DE 4039965 (Stewing) discloses a heat-shrinkable sleeve for sealing a cable splice, and having high tear-resistance. For high shrinkage rates the fibre used is a polyethylene, preferably a high density polyethylene or LLDPE, with an average molecular weight and a close molecular weight distribution of 3 to 5.

LLDPE is disclosed in GB-A-2220667 (Bowthorpe-Hellermann Limited). This specification discloses a reinforced polyethylene composition comprising low density polyethylene and, as a reinforcement, finely divided fibres of high density polyethylene. The LLDPE used may be that known by the trademark Stamylex 08-026, which has a density of 0.911 g/cm$^2$ and a melt flow index of 2.2 g/10 minutes.

A non woven fabric formed by heat-bonding filaments of LLDPE is disclosed in U.S. Pat. No. 4,981,749 (Kubo et al). The LLDPE has about 1 to 10 weight percent of octene-1, has a density of 0.900 to 0.940 g/cm$^2$, and a melt index of 5 to 45 g/10 minutes. A similar material is disclosed in U.S. Pat. No. 5,068,141.

LLDPE in sheet form is disclosed in GB-B-2019412 (Raychem). There a material is used for splice case protection comprising a cross-linked polymeric composition of LLDPE homo or copolymer which, prior to crosslinking, is characterised by a density at 25° C. of 0.940 g/cm$^2$ or less and a linearity expressed in terms of pendant methyl groups per thousand carbon atoms of the polymer chain of less than 30 with not more than 5 pendant chains greater in length than C8 per thousand carbon atoms of the polymer chain. Preferred polymers have a molecular weight distribution index of below 8, preferably from 3 to 8, e.g 3 to 7. One LLDPE given as an example is that known by the trademark Sclair 8107 UV1, which material has a degree of crystallinity of 44%, has seven pendant methyl groups per thousand carbon atoms and less than 7 short chain branches per thousand carbon atoms.

LLDPE is mentioned in general terms in GB-A-2181437 (Kabelmetal) where an electrical cable or a tube is formed from cross-linked LLDPE having a density of from 0.88 to 0.95 g/cm$^2$.

Heat-shrinkable tubes and sleeves formed from crosslinked LLDPE are disclosed in DE-A-3243102 (Kabelmetal). No explanation as to the choice of material is given except for the statement that very short branches in the chain structure of the LLDPE allows the chains to slide without any elastic recovery forces being built up.

Various references exist to the use of LLDPE for the production of thin packaging films. U.S. Pat. No. 5,110,686 (Showa Denko KK) discloses a low temperature heat shrinkable film comprising LLDPE having a short branched chain and a density of 0.935 g/cm$^2$. LLDPE is apparently chosen because a draw ratio of the film of from 3 to 6 is possible. Draw ratios above 6 apparently lead to breakage. A fibre draw ratio of 6, however, would lead to a much smaller recovery ratio of a finished composite and a product having such smaller recovery ratio would in general be unacceptable for the purposes of the present invention.

An LLDPE known by the trademark Dowlex 2045 is disclosed in U.S. Pat. No. 4,514,465 (W R Grace and Company). There a five layered thermoplastic film for use as storm windows is disclosed, one layer of which comprises LLDPE. A definition of LLDPE is given namely copolymers of ethylene with one or more comonomers selected from C4 to C10 alpha olefins such as butene-1, octene etc in which the molecules of the copolymers comprise long chains with few side chains, branches or crosslinked structures. LLDPE as defined in that specification has a density usually from 0.9 to 0.925 g/cm$^2$ and has a melt flow index from 0.1 to about 10 g/10 minutes.

U.S. Pat. No. 4,923,722 (Okura Industrial) discloses a heat-shrinkable composite film having a core layer formed of a straight chain low density polyethylene having a density of from 0.89 to 0.905 g/cm$^2$. The material used can apparently be shrunk over a wide temperature range to give a tight package free from wrinkles and having high tear strength. A crosslinked LLDPE is disclosed in U.S. Pat. No. 5,023,143 (W R Grace). Materials from Dow Chemical Company, Union Carbide and Exxon are mentioned but no further information is given than a preferred density between 0.910 and 0.935 g/cm$^2$, and a melt flow index from 1 to 6.

The nature of LLDPE is specified in slightly more detail in U.S. Pat. No. 4,820,557 (W R Grace). Here LLDPE refers to copolymers of a major amount of ethylene with a minor amount of one or more comonomers selected from $C_3$ to $C_{10}$ or higher alpha olefins, such as butene-1, pentene-1, hexene-1, octene-1, etc in which the molecules thereof comprise long chains with few side chains or branched structures achieved by low pressure polymerisation. The side branching which is present will be short as compared to non-linear polyethylenes the molecular chains of a linear polymer maybe intertwined, but the forces tending to hold the molecules together are physical rather than chemical and thus maybe weakened by energy applied in the form of heat. Specific materials mentioned include Dowlex 2045.03 and DEFD 1630 (trademarks).

Further references to LLDPE in the context of shrinkable film include U.S. Pat. No. 4,617,241 (W R Grace), U.S. Pat. No. 4,514,465 (W R Grace), U.S. Pat. No. 4,590,124 (W R Grace), GB-A-2135240 (W R Grace) and U.S. Pat. No. 5,079,051 (W R Grace).

Many of these references relating to shrinkable thin film are concerned with the formation of multi-layer structures, it being through the combination of various films that the desired properties are allegedly achieved. No consideration appears to be given to the precise nature of the LLDPE even though a wide variety of grades is available.

In spite of this, we have found that in order to produce a satisfactory product that will meet the demanding requirements of, for example, outside plant cable sealing great care must be taken in materials selection: materials must be chosen bearing in mind manufacture, heat installation, and long-term performance. We have found that, in general, fibre-reinforcement is desirable and that a fibre should be stretched 8, 9, 10 fold during manufacture if it is to provide the desirable degree of shrinkage in the final product. A particular draw force is desirable at the limit of this stretching and also after subsequent recovery of say 5X (which ratio is expressed as the pre-shrinkage length divided by the post-shrink length). This residual recovery force will ensure a safety margin after the desired dimensional change has occurred. If the draw force is insufficient then the fibres will not sufficiently drive shrinkage of the overall product, or will inhibit shrinkage of other active components, and if the draw force is too high then fibre breakage is likely. A further requirement is that the fibres shrink at a sufficiently low temperature and require a sufficiently small amount of heat. Most of the LLDPEs available do not meet these requirements.

We have found that LLDPEs having a certain molecular weight and a certain crystallinity and preferably a certain $T_m$ value allow a product to be made having dramatically superior performance, especially during installation. Fibres may be made from one or more of these preferred LLDPEs alone, or that material may be blended with other polymers. Examples of other polymers include other polyolefines such as HDPE and other LLDPEs, and materials such as EPDM. The extent of the improvement will depend, of course, on the proportion of the total material that consists of the selected LLDPE, but benefits are noticeable over a wide range of compositions.

By choosing an LLDPE and by selecting any of the characteristics mentioned herein, particularly $M_w$ and crystallinity, we believe we have avoided to some extent the dichotomy between low temperature performance and high strength or high recovery ratios. It is in principle simple to produce a material that shrinks at a low temperature, provided one is prepared to accept a low degree of shrinkage and low shrink force.

Whilst we do not wish to be bound by any theory, we believe we have achieved a useful compromise between the energy required to release the shrinkage forces and the size of those forces as follows. We have selected a reasonably high molecular weight and as a result benefit from long molecular chains whose entanglement provides the desired strength. We are able to reduce the amount of heat required for shrinkage by reducing the crystallinity of the material such that a smaller latent heat of crystallisation is required before the oriented molecules can revert to their thermodynamically stable conformations. Surprisingly, we have been able to achieve this by using a material that is predominantly designed for use as a cast film and which was not intended as a fibre-forming material.

Thus, the present invention consists in a composite material having heat-shrinkable fibres comprising LLDPE, characterised in that the LLDPE has a weight average molecular weight ($M_w$) of from 55,000 to 130,000 and a crystallinity less than 60%.

Molecular weight parameters Mw, Mn etc and molecular weight distribution (D) etc, were carried out using gel permeation chromatography (GPC) utilising the following conditions.

Solvent: o-dichlorobenzene at 140° C. at a flow rate of 1 ml/minute
Sample: 200 mliters of 0.3% concentrations of polymer in o-dichlorobenzene. Sample filtered before injection.
Internal flow marker incorporated
Detector: Infra-red detector measuring at 3.42 mm.
Columns: 2×60 cm. 10 mm Polymer Laboratories Mixed Gel
Data Reduction: Polymer Laboratories Caliber software
Molecular Weight Standards: Polystyrene narrow molecular weight standards. A 3rd order polynomial was fitted through the calibration points.

Sample results were expressed as LDPE equivalents using the Mark-Houwink equation with values for the K and a constants as follows.

|   | Polystyrene | LDPE |
|---|---|---|
| K | $13.8 \times 10^{-5}$ | $50.6 \times 10^{-5}$ |
| a | 0.7 | 0.7 |

The LLDPE preferably has a $M_w$ less than 120,000, more preferably less than 110,000, particularly less than 100,000 and preferably greater than 60,000 more preferably greater than 65,000 in particular greater than 70,000. For most uses we prefer that $M_w$ is from 70,000 to 90,000. The crystallinity of the LLDPE is preferably less than 55, more preferably less than 50, particularly less than 45 especially less than 40%. Generally a crystallinity of at least 15, preferably at least 20, especially at least 30% will be desirable if the material is to have a satisfactory shelf-life. This will of course depend on where in the world the material is to be used, and on the way on which it is stored. Various other characteristics of the LLDPE may be mentioned as preferred. It preferably has a $T_m$ value of from 60° to 130° C., more preferably 80° to 128° C., especially 100 to 128, more especially 125° to 128° C.

In general we prefer that the material crystallises with imperfect crystals in order that some melting occurs in the early stages of the heating carried out for heat recovery. In this way the so-called induction time (the heating time during which no shrinkage is visible) can be reduced. As a result the total heating time might be reduced, but in any case a more controlled and steady shrinkage can be carried out in practice. The extent to which the crystallites of the LLDPE are perfect can be readily observed from a differential scanning calorimetry plot where imperfect crystals manifest themselves as a peak having a broad tail towards the low-temperature end. This can be controlled to some extent by the molecular weight of the LLDPE and by the number and type of comonomer involved in its manufacture. We prefer that the LLDPE have from 2 to 30, more preferably from 5 to 25, particularly from 10 to 20 branches per thousand carbon atoms, which branches are preferably derived from a $C_6$ to $C_{10}$ comonomer, particularly octene.

The LLDPE preferably has a molecular weight distribution of 2–6, more preferably from 3 to 5, particularly from 3.5 to 4.2.

The LLDPE can also be characterised at least in part by its melt flow index (MFI) and this is a function at least of molecular weight. A preferred range is from 0.7 to 10 g/10 minutes, preferably at least 0.9, more preferably at least 0.2, most preferably at least 3, and preferably less than 8, more preferably less than 6. MFI measurement conditions herein are ASTM D1238, 190° C./2.16 Kg.

In order to render it shrinkable, the LLDPE is stretched by a suitable amount which will depend on the amount of shrinkage desired in the final product, on the other components of the product with which it is used, and on the form in which it is used. For many purposes, we prefer a stretch ratio of at least 6X, preferably at least 8X, particularly at least 10X.

In general we prefer that the fibres be crosslinked particularly by radiation. This may be carried out before or after stretching. A suitable irradiation dose will depend on the precise nature of the polymer and on the extent to which it has been stretched, although 10 to 25, preferably 15 to 25, more preferably 18 to 22 Mrads may be taken as a guide. Where the LLDPE (or blend containing LLDPE) is crosslinked some of the characteristics mentioned above might not be determinable directly. In general, the quantities given herein by means of which the LLDPE is characterised refer to the polymer before crosslinking and it will generally be possible to estimate the pre-crosslinking values from analysis of a crosslinked material.

The table below lists some preferred materials for use as the LLDPE of the present invention.

TABLE 2

| Supplier | Trade Name | Grade | Density g/cm³ | MFI g/10 min | Tm °C. | Xinity % | Mn | Mw | d | Mz | Mz + 1 | C8/ 1000 C. | Force 10 × cN/fibre | R.F. at 5 × N/fibre |
|---|---|---|---|---|---|---|---|---|---|---|---|---|---|---|
| DSM | Stamylex 09-258 | Injection | 0.917 | 25 | 118 | 33.8 | 17200 | 53300 | 3.1 | 177500 | 531777 | | N.A. | |
| DSM | Stamylex 1066F | Cast film | 0.919 | 6.6 | 126 | 37.4 | 18800 | 72900 | 3.9 | 306500 | 950626 | 14 | 1190 | 0.084 |
| DSM | Stamylex 1046F | Cast film | 0.919 | 4.4 | 126 | 34.6 | 22100 | 80700 | 3.6 | 385600 | 1534384 | 14 | 1420 | 0.107 |
| DSM | Stamylex 3026F | Cast film | 0.932 | 2.2 | 128 | 46.5 | 24100 | 97200 | 4 | 516625 | 1775951 | | 2590 | 0.272 |
| DSM | Teamex 1000 | Cast film | 0.902 | 2.2 | 123 | 18.9 | 21900 | 97800 | 4.5 | 563800 | 2318801 | 24 | 860 | 0.101 |
| DSM | Stamylex 4026F | Cast film | 0.935 | 2.2 | 129 | 49.4 | 25800 | 99900 | 3.9 | 555700 | 2122340 | | 3000 | 0.335 |
| DSM | Stamylex 1016F | Cast film | 0.919 | 1.1 | 124 | 37.7 | 27200 | 113400 | 4.2 | 548500 | 1602316 | 14 | 2220 | 0.305 |
| Dow | Dowlex 2552E | Injection | 0.92 | 25 | 128 | 35.7 | 15000 | 52500 | 3.5 | 163500 | 441464 | 18 | 800 | 0.045 |
| Dow | Dowlex 2288E | Cast | 0.917 | 3.3 | 127 | 35.3 | 24900 | 89300 | 3.6 | 365400 | 1084718 | | 1760 | 0.18 |
| Dow | Dowlex 2045E | Blown | 0.92 | 1 | 125 | 39.4 | 25800 | 118900 | 4.6 | 556700 | 1660156 | | 1500 | |
| Dow | Dowlex NG5056E | Blown | 0.919 | 1.1 | 122 | 38.1 | 27400 | 119900 | 4.4 | 674000 | 2883356 | | 2000 | |
| Dow | Attane 4011E | Blown | 0.912 | 1 | 120 | 30.5 | 32800 | 122800 | 3.7 | 518600 | 1475123 | | 1900 | 0.357 |
| Du Pont | Sclair 2111 | Injection | 0.924 | 20 | 125 | 41 | 17700 | 57500 | 3.2 | 216100 | 745635 | | N.A. | |
| Du Pont | Sclair 8107 | Rot. mould | 0.922 | 5 | 123 | 43.1 | 22400 | 78700 | 3.5 | 284500 | 742141 | | 1330 | 0.164 |

Of the materials in the above table at present we prefer those known by the following trademarks: Stamylex 1046F, Stamylex 1066F, Dowlex 2288E. It may be noted that none of the materials in the above table are marketed as fibre-grade materials.

We prefer that the composition of the invention is shrinkable by virtue of the heat shrinkable fibres comprising LLDPE. It is possible however that these fibres be present as part of a composite where recovery is at least principally driven by other components such other components may comprise other fibres or may comprise sheet material.

For most purposes the fibres will form part of a fabric since this aids formation of the product and allows the shrinkable LLDPE to be combined with other fibres contributing other functions to the product. For example, the LLDPE fibres may be combined with glass or other high-strength, non-shrinkable fibres which contribute to the overall strength of the product. This may be achieved by providing a weave comprising a warp or weft comprising the shrinkable LLDPE fibres, and respectively a weft or warp of glass. Either or both types of fibre may be present as monofilaments or as multi filaments. Where multifilament fibres are used, interstices thereof may be blocked, for example by the provision of hybrid fibres. See EP-A-0324630. In general, when the composite material is to be used for environmental protection of a cable etc the composition will be provided as a tubular or wraparound sleeve where the recoverable fibres run substantially circumferentially. In this way, those fibres can drive recovery to cause engagement of the material with the cable to be protected and can also provide protection against longitudinal splitting. Instead of a woven fabric a knit, braid or non-woven fabric may be provided comprising the LLDPE fibres.

In most cases the fabric will be made impervious by combining it with a matrix material, which may comprise one or more layers of polymeric material applied to the fabric. The matrix material preferably permeates interstices of the fabric to produce a truely unitary structure. The shrinking fabric preferably deforms heat-softened matrix material such that the unitary structure is retained with no delamination. The degree of imperviousness will depend on the final use of the product, but we prefer that it be impervious at least to liquids and preferably also to air. Most polymeric materials are slightly pervious to moisture vapour but the rate of permeation of moisture through a composite of the sort described will be sufficiently low that a product life time of many years will readily be achieved. Where extremely low levels of moisture penetration are necessary the composite material may include a moisture-vapour barrier layer such as an aluminium or other metal foil. Such a barrier layer may be applied after the application of a polymeric layer and on the side of it facing away from the fabric, and preferably on the side closer to the substrate around which the material is to be shrunk. Various further layers may be provided for example a hot-melt or otherwise heat-activatable adhesive. Such an adhesive will, in general, be inwardly-facing in the final product so that it causes a bond to be formed between the composite material proper and the cable etc to be protected.

Various materials may be used for the so-called matrix material. At present we prefer low density polyethylene which may be cross-linked. A low degree of crosslinking will in general be sufficient since the principal purpose of crosslinking is merely to stop excessive flow during heat recovery. As with the fibres, crosslinking may be carried out by irradiation, but here a dosage of from 0.5 to 5, preferably 1–4, more preferably 2.5 to 3.5 Mrads will in general be sufficient. The low density polyethylene or other layer may be, for example, from 0.1 to 10, more preferably 0.1 to 1.0, especially 0.2 to 0.4 mm thick. We have found that quite thin layers can be sufficient. In this way we are able to reduce further the amount of heat required for installation since the thermal mass of the product is reduced. Where the fabric is coated on each side with a polymeric layer we prefer that the layers be of about the same thickness, although they can differ by for example a factor of from 1.5 to 3. For example, each layer may be about 0.25 mm thick. It is preferred that the outer layer be unstressed since an unstressed layer is less likely to split when heated.

The thickness of the fibres and their weave (or other fabrication) density can be selected according to the recovery force, recovery ratio, and general ruggedness desired of the product. For many purposes a recoverable fibre diameter of 0.2 to 1.0, more preferably 0.2 to 0.6, especially 0.3 to 0.5 mm will be suitable. A fairly open design of fabric is preferred and for many uses a satin weave of float from 2 to 7 especially from 3 to 6 is expected to be satisfactory.

The composite material of the invention will generally be supplied in the form of a sleeve, particularly in the form of a wraparound sleeve having some form of closure means running along opposing longitudinal edges thereof. Such closure means are commonly known as "rails", which can conveniently be held together after the product has been wrapped around a cable by means of a channel that is C-shaped in cross section.

This allows the material of the invention to be installed around a cable without access to a free end of the cable.

Whilst the invention has many uses, we foresee its particular use in a method of environmentally protecting a substrate such as an optical fibre cable or a telecommunications cable splice, in which method the composite material is positioned around the splice such that it extends from one intact cable jacket at one side of the splice to intact cable jacket at the other side of the splice. Once it is in position it may be heated using for example a hot air gun.

I claim:

1. A composite material comprising a fabric having heat shrinkable fibres comprising LLDPE, wherein the LLDPE has a weight average molecular weight of from 55,000 to 130,000 and a crystallinity less than 60% and a melt flow index of from about 0.7 to 10, and including a polymeric matrix material applied to the fabric that renders the composite material substantially impervious to liquid.

2. A material according to claim 1, in which the LLDPE has a density less than 0.93 g/cm$^2$.

3. A material according to claim 1, in which the LLDPE has a T$_m$ value from 100° to 130° C.

4. A composite material according to claim 1, in which the LLDPE has a molecular weight distribution of from 2 to 6.

5. A material according to claim 1, in which the LLDPE is crosslinked.

6. A material according to claim 1, which is heat shrinkable by virtue of the heat shrinkable fibres comprising LLDPE.

7. A material according to claim 1, in which the fibres consist substantially only of LLDPE.

8. A material according to claim 1, in which the fabric additionally comprises non-heat shrinkable fibres.

9. A composite material comprising a woven fabric having warp and weft fibres forming interstices, wherein at least one of the warp and weft fibres includes heat shrinkable fibres comprising LLDPE, the LLDPE having a weight average molecular weight of from 55,000 to 130,000 and a crystallinity less than 60%, and including a polymeric matrix material applied to the fabric and within the interstices that renders the composite material substantially impervious to liquids.

10. A composite material according to claim 9 wherein said LLDPE has a melt flow index from about 0.7 to about 10.

11. A composite material according to claim 9 wherein said heat shrinkable fibers comprise a blend of LLDPE.

12. A composite material according to claim 1 wherein said heat shrinkable fibres comprise a blend of LLDPE.

13. A method of environmentally protecting a substrate, including a telecommunications cable or splice comprising the steps of positioning around the substrate a composite material comprising a fabric having heat shrinkable fibres comprising LLDPE, wherein the LLDPE has a weight average molecular weight of from 55,000 to 130,000 and a crystallinity less than 60%, and a polymeric matrix material applied to the fabric that renders the composite material substantially impervious to liquid, and heat shrinking the composite material over the substrate so that the substrate is environmentally protected.

14. A method according to claim 13, in which the heat shrinkage is caused by heating the material with a hot air gun.

* * * * *

UNITED STATES PATENT AND TRADEMARK OFFICE
CERTIFICATE OF CORRECTION

PATENT NO. : 5,763,032
DATED : June 9, 1998
INVENTOR(S) : Hutt

It is certified that error appears in the above-identified patent and that said Letters Patent is hereby corrected as shown below:

In each of claims 2, 3, 5-8, line 1, add the word -- composite-- before the word "material"

Signed and Sealed this

Thirteenth Day of October 1998

BRUCE LEHMAN

Attest:

Attesting Officer

Commissioner of Patents and Trademarks